N. OCKERLUND.
Rule and Calculator.
No. 102,034.  Patented April 19, 1870.
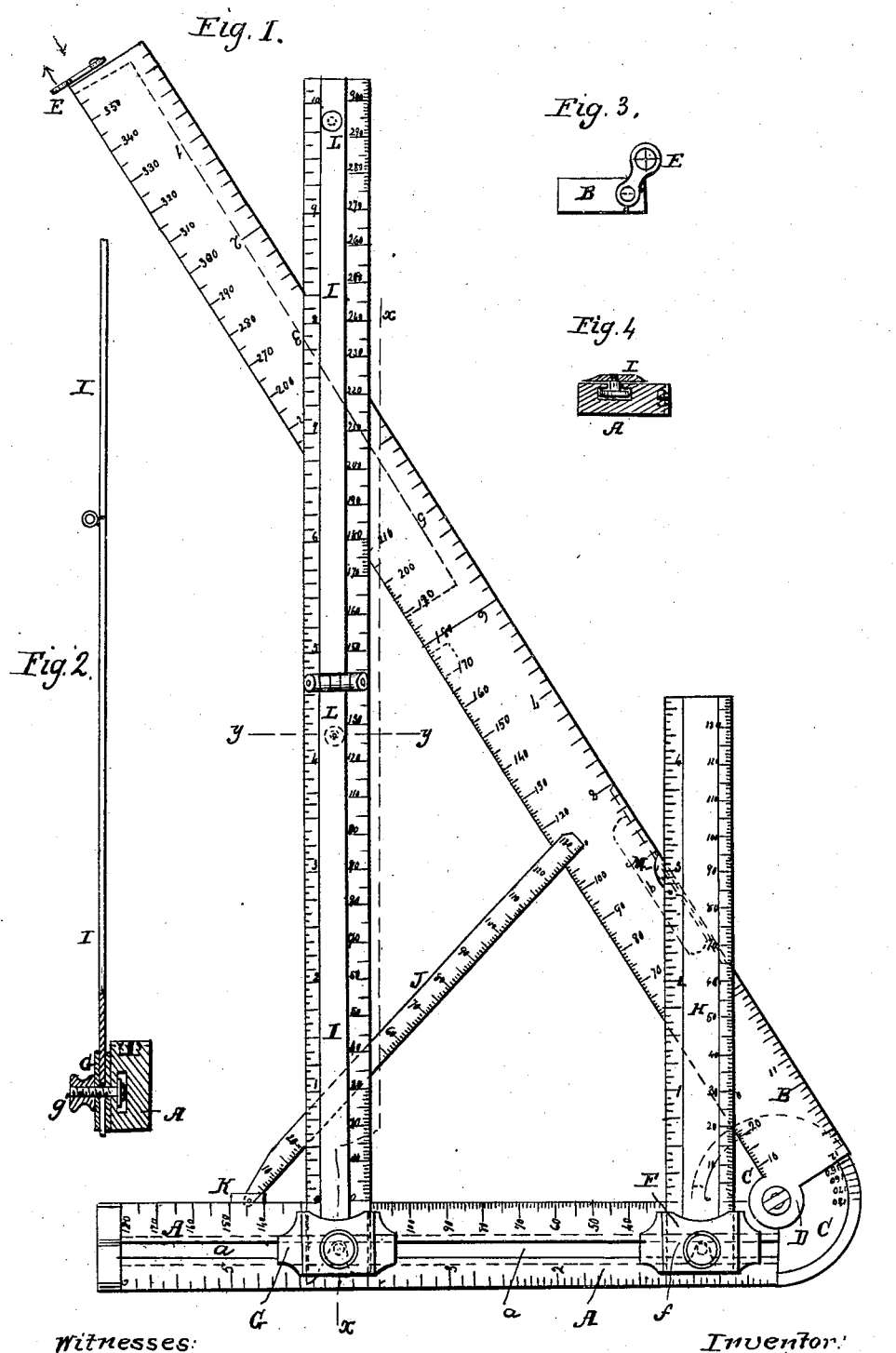

United States Patent Office.

NELS OCKERLUND, OF NEW YORK, N. Y.

Letters Patent No. 102,034, dated April 19, 1870.

IMPROVEMENT IN RULE AND CALCULATOR.

The Schedule referred to in these Letters Patent and making part of the same.

*To all whom it may concern:*

Be it known that I, NELS OCKERLUND, of the city of New York, in the county of New York and State of New York, have invented a new and useful Improvement in Combined Rule and Calculator; and I do hereby declare that the following is a full, clear, and exact description thereof, which will enable others skilled in the art to make and use the same, reference being had to the accompanying drawings forming part of this specification.

Figure 1 is a side view of my improved instrument opened out, and showing all its parts attached.

Figure 2 is a detail view, partly in section, through the line $x\,x$, fig. 1.

Figure 3 is a detail end view of one of the arms of the rule, showing the cross-hair sight.

Figure 4 is a detail sectional view of one of the sliding scales taken through the line $y\,y$, fig. 1, but showing it attached to the grooved arm of the rule.

Similar letters of reference indicate corresponding parts.

A and B are the arms of the rule, which is jointed and hinged in the manner of an ordinary rule. Upon the outer edge of the arms A B are formed scales of inches and fractions of an inch, similar to the scale of an ordinary rule.

Upon the inner edges of the arms A B are formed scales of thirtieths or other convenient parts of an inch, as shown in fig. 1.

C is a disk, through the center of which passes a bolt that pivots the arms A B to each other. The disk or circular plate C is rigidly attached to or formed solidly upon one of the arms, as A, and works in a groove in the other arm B. The side of the disk C, over which the inner edge of the arm B moves, is divided into a scale of degrees, so that the instrument may be used for taking angles.

For convenience in doing this, upon the head of the bolt that pivots the arm B to the arm A is formed a sight, D, and to the other end of the arm B, in a line with its inner edge, is pivoted a cross-hair sight, E, which, when not required for use, may be turned down along said end, so as to be entirely out of the way.

In the middle part of the face of the arm A is formed a longitudinal dovetailed groove, $a'$, in which moves the slides F G, which are made with sockets to receive the scales H I, and are provided with clamping-screws $f'$ and $g'$, to secure them in place in the groove $a'$, and at the same time to clamp the scales H I in their sockets. The edges of the scales H I are beveled off, and upon the said bevels are formed scales, corresponding with the scales upon the arms A B. The scale H, which is nearest to the angle or center joint of the rule, is made half the length of the other scale I.

The longer scale I is jointed or hinged at its center, as shown in figs. 1 and 2. When not required for use, the scale is folded up, the scale H placed between its arms, and the two scales are placed in a socket or recess, shown in dotted lines in fig. 1, in the inner edge of the outer part of one of the arms B, and shutting into a similar socket formed in the outer part of the other arm.

J is an arm, one end of which is pivoted to a slide, K, working in a dovetailed groove in the inner edge of the inner part of the arm A, and upon which is formed a scale corresponding with the finer scales of the arms A B and of the scales H I.

In the scale I are formed two screw-holes to receive the two small thumb-screws, L, the heads of which are milled, for convenience in operating them, said heads being so formed as to fit into the groove $a'$ of the arm A.

The screws L are designed to adapt the instrument for use as an adding-machine. When used for this purpose the slides F G are detached, the screws L inserted in their places from opposite sides of the scale I, the one in the upper side of the upper part serving as a handle for operating the slide I in adding, while the one in the lower side, near the middle part of the scale, is slipped into the groove $a'$. The lower end of the scale I is then slipped down upon the arm A until its inner end coincides with a number to be added found upon the arm B, the rule being closed at its center joint. The number to be added to it is then found upon the scale I, and immediately opposite it, upon the scale B, will be found the amount of the two numbers.

The two screws, L, when not required for use, are screwed into screw-holes formed for their reception in the outer end of the arm A, so as to be out of the way, and at the same time ready for use when required.

The two slides, F G, and the two scales, H I, enable the instrument to be used for solving problems which require the finding of the fourth term of a proportion. To do this, the slides F G are adjusted till the pointers upon the lower ends of the scales H I point to two of the given terms of the proportion. The arm B is then moved upon its pivot until the third term of said proportion found upon the said arm B may be brought to the edge of the scale H, when the fourth term of the proportion will be found upon the arm B, at its intersection with the edge of the scale I.

The instrument may also be used for finding the area of triangles when the lengths of the three sides are known. To do this, the three arms, A B J, are adjusted to represent the length of the three sides of the triangle. The scale H is then moved along the arm A, which represents the base of the triangle, until its edge is exactly in the angle at the apex of the triangle. This gives the measure of the perpendicular and two bases of the two right-angled triangles into which the given triangle is divided, rendering the solution of the problem easy. In the arm B is placed a spirit-bottle, M, as shown in fig. 1, which enables the instrument to be used as a spirit-level, and also for measuring angles in a vertical plane.

These are only a few of the many uses to which my improved instrument may be applied with great advantage.

Having thus described my invention,

I claim as new and desire to secure by Letters Patent—

1. A combined rule and calculator formed by the combination of the jointed arms A B, disk C, sights D E, spirit-bottle M, slides F G, scales or arms H I, pivoted sliding scale J K, and thumb-screws L, with each other, substantially as herein shown and described.

2. The combination of the graduated disk C and sights D E with the jointed rule A B, substantially as herein shown and described and for the purpose set forth.

3. The combination of the two slides, F G, and two scales, H I, with the jointed rule A B, substantially as herein shown and described and for the purpose set forth.

4. The combination of the two slides, F K, and two scales, H J, with the jointed rule A B, substantially as herein shown and described and for the purpose set forth.

5. The combination of the screws L and scale I with the jointed rule A B, substantially as herein shown and described and for the purpose set forth.

The above specification of my invention signed by me this 22d day of February, 1870.

NELS OCKERLUND.

Witnesses:
  GEO. W. MABEE,
  JAMES T. GRAHAM.